(No Model.) 2 Sheets—Sheet 1.

C. H. VEEDER.
CYCLOMETER.

No. 548,482. Patented Oct. 22, 1895.

Witnesses:-
D. H. Haynes
S. H. Irish

Inventor:-
Curtis H. Veeder
by Redding & Kiddle
Atty's (No Model.) 2 Sheets—Sheet 2.

C. H. VEEDER.
CYCLOMETER.

No. 548,482. Patented Oct. 22, 1895.

Witnesses:—
D. H. Haynord
S. H. Irish

Inventor.
Curtis H. Veeder
by Redding & Kiddle
Attys

UNITED STATES PATENT OFFICE.

CURTIS H. VEEDER, OF HARTFORD, CONNECTICUT, ASSIGNOR TO THE VEEDER MANUFACTURING COMPANY, OF SAME PLACE.

CYCLOMETER.

SPECIFICATION forming part of Letters Patent No. 548,482, dated October 22, 1895.

Application filed April 27, 1895. Serial No. 547,305. (No model.)

*To all whom it may concern:*

Be it known that I, CURTIS H. VEEDER, a citizen of the United States, and a resident of the city and county of Hartford, State of Connecticut, have invented certain new and useful Improvements in Cyclometers, &c., of which the following is a specification, reference being had to the accompanying drawings, forming a part hereof.

This invention relates to the general class of revolution counters or indicators, and particularly to devices of this character usually known as "cyclometers," which are adapted to indicate the distance traveled by wheeled vehicles, such as velocipedes.

Some of the features of the invention may be found advantageous for adoption in other constructions; but the main object of the invention has been to produce a cyclometer which shall be small, compact, and light, and yet of such simple construction as to be easily made and not liable to get out of order.

In the construction which is herein shown as embodying the invention the indicating-figures are placed on the peripheries of rings which are mounted side by side on a common axis and have their peripheries unbroken by gear-teeth, wherefore the indicating-figures are brought to view in a straight line and can be read easily. The transmitting and reducing mechanism is included within the circumference of the cylinder formed by the index-rings, thereby permitting the shell or casing also to be cylindrical and of but slightly-greater diameter than the index-rings themselves, and the whole device to be exceedingly compact and small. Moreover, only a single rotating shaft is required, and that protrudes through the shell at one end only and can there be tightly packed, so that the shell is practically both dust and water proof. The parts required are few in number, easily constructed, and, although small, are not so delicate as to be subject to rapid wear or danger of breakage.

The improved construction will be fully described hereinafter with reference to the accompanying drawings, in which—

Figure 1:
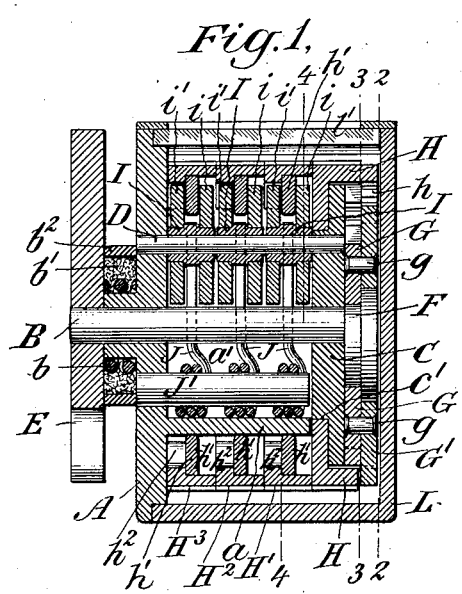
Figure 2:
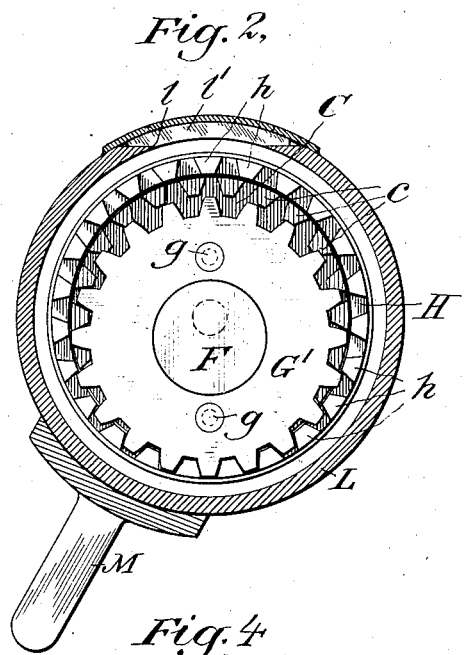
Figure 3:
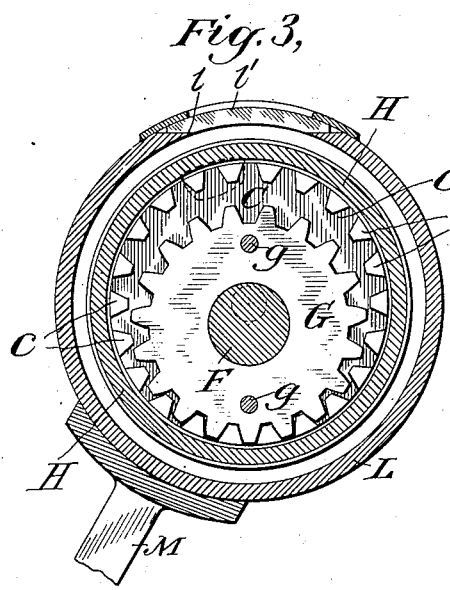
Figure 4:
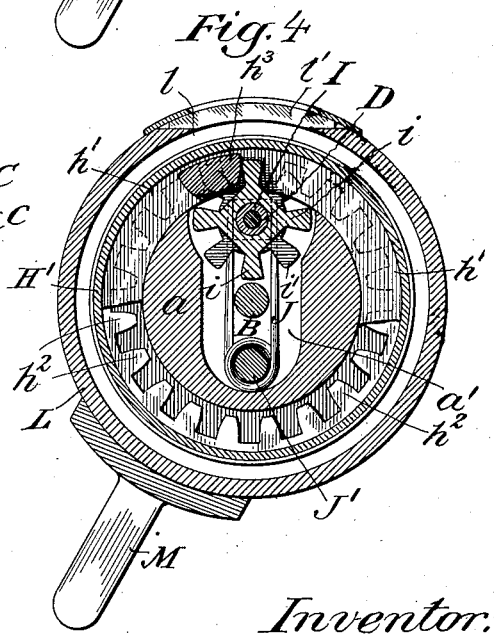
Figure 5:
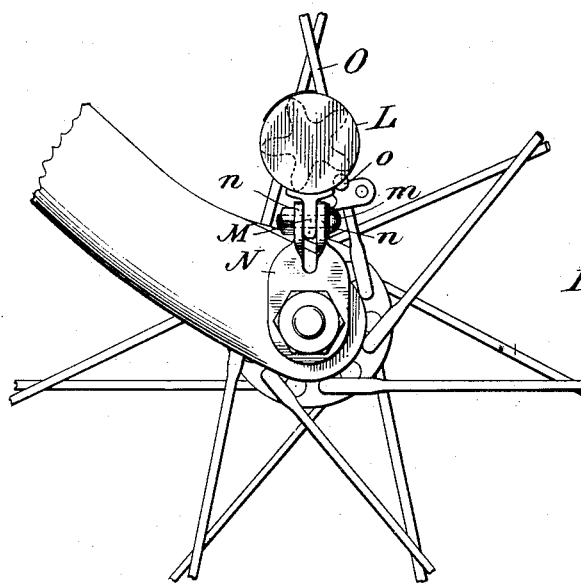
Figure 6:
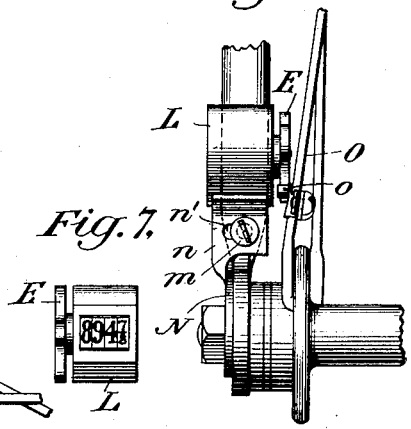
Figure 7:
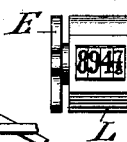
Figure 8:
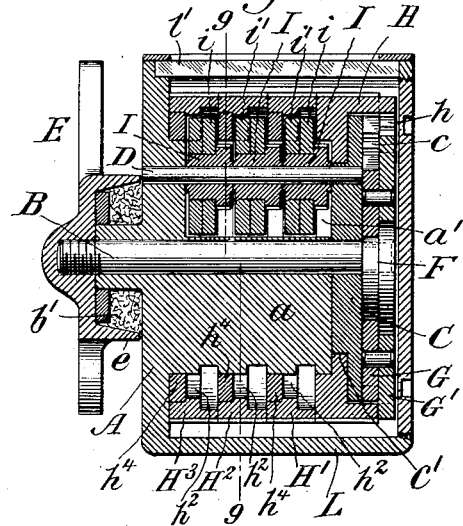
Figure 9:
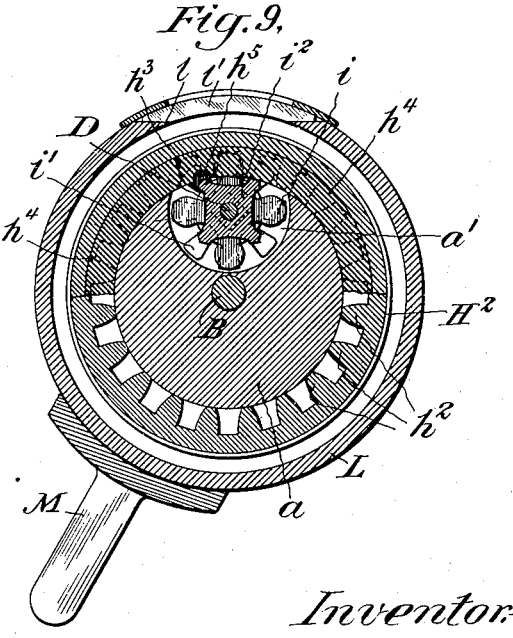

Figure 1 is a view of a cyclometer embodying the invention in central longitudinal section. Fig. 2 is a transverse section on the plane indicated by the line 2 2 of Fig. 1. Fig. 3 is a transverse section on the plane indicated by the line 3 3 of Fig. 1. Fig. 4 is a transverse section on the plane indicated by the line 4 4 of Fig. 1, a portion of the bearing-ring of the index-ring being broken away to show the gear-teeth beyond it. Fig. 5 is a side elevation of a sufficient portion of a velocipede to illustrate the application of the improved cyclometer thereto, the scale being smaller than that of Figs. 1 to 4. Fig. 6 is a front elevation of the same, most of the spokes being omitted. Fig. 7 is a plan view of the cyclometer on the same scale as that of Figs. 5 and 6. Fig. 8 is a view similar to Fig. 1 and on the same scale therewith, but illustrating a slight modification in the devices for preventing accidental movement of the index-rings. Fig. 9 is a transverse section on the plane indicated by the line 9 9 of Fig. 8, a portion of the locking-ring being broken away to show the gear-teeth beyond it.

The several operative parts of the improved mechanism may be carried by a plate A, which is preferably circular in outline and formed with a hub or other support $a$, hereinafter referred to as the "hub," which affords a bearing for the parts which are mounted thereon, and is hollow or chambered, as at $a'$, or otherwise adapted to receive within it certain parts of the transmitting and reducing mechanism, whereby such parts may be wholly inclosed within the circumference of the cylinder formed by the indicating-rings hereinafter referred to. The actuating-shaft B preferably has a bearing in the plate A and also in a disk C, which is held by pins (not shown) in the end of the hub $a$. A rod D, hereinafter referred to, is supported at one end in the plate A and at the other end in the disk C. The shaft B has fixed upon its outer end the star-wheel E, by which it is actuated, and upon its inner end an eccentric F, which is preferably stepped or shouldered, as shown. A spring $b$ may be interposed between the star-wheel E and the plate A to hold the eccentric F closely against the abutment formed by the disk C, thereby creating sufficient friction to prevent the star-wheel from jarring out of position or from moving too far when struck by the actuating-pin carried by the wheel of the vehicle. A packing $b'$, of felt or other suitable material, may be placed around he spring to exclude dust from the shaft-bearing and may be held in place by a ring $b^2$.

The eccentric F fits freely in the centrally-disposed apertures of two gears G and G', which are secured together by pins or rivets $g\ g$ or otherwise. It will be understood that the two parts of the eccentric F have coincident axes and form virtually a single eccentric, which is stepped or shouldered, as shown, merely for the purpose of holding the gears firmly against the face of the disk C and creating friction to prevent accidental movement. The disk C is provided with gear-teeth $c\ c$ near its periphery to form an internal fixed gear to mesh with the gear G as the latter is rolled round by the eccentric and to occasion thereby the revolution of said gear G upon the eccentric and a consequent revolution of the gear G' with the gear G. The gear G' meshes with an internal gear formed by teeth $h\ h$ on the inner surface of the first index-ring H, which may be mounted to rotate on the hub $a$, or, as shown, a hub $c'$, formed on the rear of the disk C. The number of the teeth $h\ h$ is greater by one than the number of the teeth $c\ c$, and as a consequence, as the gears G and G' are rolled together within the two gears $c\ c$ and $h\ h$, the latter and the index-ring H therewith will be given a very slow revolution. I prefer that the several gears shall be so proportioned that the index-ring H shall revolve once for each mile traversed, and therefore upon its periphery are indicated successive fractional parts of a mile, the figures being brought to view at the sight-opening in succession. It is obvious that the gearing just described constitutes an ordinary and well-known form of differential gearing, and consequently it requires no further description or explanation herein.

Upon the rod or pin D, between the disk C and the plate A, are mounted sleeves I I, which correspond in number and arrangement with the several index-rings beyond the first or fractional ring. Each sleeve I carries at one end a toothed or star wheel $i$ and on the other end a pinion $i'$, the toothed wheel and pinion being formed independently of or integral with the sleeve, as may be most convenient. The hub in the center of the sleeve is flattened, as indicated by dotted lines in Fig. 4, and is embraced by the arms of a spring-fork J, which is supported by a pin J', fixed in the plate A, and disposed in the lower part of the chamber $a'$ of the hub $a$. The object of this arrangement is to prevent a movement of the toothed wheel and pinion through a distance greater than from one tooth to the next at each actuation thereof, as hereinafter described. The arrangement of the spring-arms, as shown, bearing against opposite or substantially opposite faces of the flattened hub, secures a maximum of torsional effect with a minimum of friction, thereby preventing accidental movement without making the mechanism hard to move.

The several index-rings H', H², and H³ have each a bearing ring or flange $h'$, which rests upon the hub $a$ before referred to, and supports the index-ring for revolution. Each bearing-ring also enters between the wheel $i$ and pinion $i'$ of the corresponding pair and serves to retain them in proper position in relation to the index-rings. Each index-ring H' H² H³ also has internal gear-teeth $h^2$, adapted to be engaged by the corresponding pinion $i'$, and each index-ring H' H², as well as the fractional ring H, has a pin $h^3$, projecting from a point near its circumference and adapted to engage and actuate the toothed wheel $i$ corresponding to the next index-ring beyond it. Thus as each index-ring completes a revolution it causes the movement of the next index-ring one step forward. The driving-pin $h^3$, projecting from the ring H, is shown in section in Fig. 4 and is indicated by dotted lines in Fig. 3. The remaining pins are exactly similar to this, and it is therefore unnecessary to complicate the drawings by attempting to show them.

It will be observed that the pin J', the springs J J, the rod or pin D, and the several parts of the reducing and transmitting mechanisms are all included within the chamber or recess of the hub $a$ and therefore within the circumference of the cylinder formed by the index-rings. The casing of the cyclometer is completed by a cylindrical shell L, which is but slightly larger in diameter than the index-rings and is secured to the plate A and provided at $l$ with a sight-opening, which may be closed, to prevent access of dust or moisture by a piece of glass or other suitable transparent material.

The cyclometer is intended to be attached to the frame of the velocipede or other vehicle in proximity to a wheel, as usual, and for this purpose the shell or casing may be provided with an arm M, which may be clamped by a bolt $m$ (see particularly Figs. 5 and 6) between the two arms $n\ n$ of a forked plate or bracket N, which may be secured to the front axle of a bicycle or to any other convenient point, the two arms $n\ n$ being preferably slotted, as indicated at $n'$, to permit of lateral adjustment with respect to the wheel or other moving part of the vehicle which actuates the cyclometer. As represented in Figs. 5 and 6, one of the spokes O of the wheel of the vehicle may have clamped thereon a suitable actuating-pin $o$, which is adapted to engage the star-wheel E and effect a step-by-step rotation thereof during the successive revolutions of the vehicle-wheel.

It will be obvious that various modifications might be made in details of construction without departing from the spirit of my invention, and as one such modification I have represented in Figs. 8 and 9 an arrangement, different from that shown in Figs. 1 and 4, for preventing any accidental movement of the transmitting mechanism. The arrangement of the reducing mechanism and of other general features is the same as that shown in Figs. 1, 2, 3, and 4 and need not be referred to again, some of the letters of reference employed on said figures having been added to Figs. 8 and 9 for convenience in identification of the parts. As a detail of construction of altogether minor importance, the star-wheel E is represented as having a flange $e$ to inclose the packing $b'$ around the bearing of the shaft B in the plate A. The hub $a$, as before, has a chamber $a'$ to inclose the transmitting mechanism, the several sleeves I I whereof are mounted upon a rod or pin D. The index-rings $H'$ $H^2$ $H^3$ may have the points of their gear-teeth $h^2$ bearing directly upon the hub $a$ and may be thereby supported for revolution. Each of the index-rings $H'$ $H^2$ $H^3$ has fixed thereto a locking-ring $h^4$, which has in its inner periphery a single notch $h^5$, and which may also serve as a bearing-ring. As represented in Fig. 8, the rings $H'$ $H^2$ $H^3$ have their locking-rings formed independently and secured thereto, while the ring H is represented as having the locking-ring formed integrally therewith, these being merely convenient details of construction. It will be understood, of course, that the ring $h^4$ of the last index-ring of the series has no function except as a bearing-ring. The toothed wheels $i$ and the pinions $i'$ are secured to their respective sleeves I I face to face, and the gear-teeth $h^3$ of the respective rings $H'$ $H^2$ $H^3$ are correspondingly disposed, so that they may be engaged by their respective pinions $i'$. The toothed wheels $i$ are adapted to be engaged and driven as before by a pin projecting from the preceding index-ring. Each sleeve I, instead of having flat faces to co-operate with springs bearing thereon, has formed therewith or secured thereon a star-wheel $i^2$. This wheel is so shaped and is so placed with reference to the preceding index-ring that two points thereof may bear against the inner periphery of such preceding index-ring or of the locking-ring $h^4$ secured thereto and thereby hold said sleeve and its pinion and toothed wheel from rotation until such preceding index-ring is about to complete a revolution, at which time the driving-pin $h^3$ carried thereby engages the toothed wheel $i$, and at the same time the notch $h^5$ in the locking-ring, which is in line with said pin $h^3$, comes into such position with respect to one of the teeth of the star-wheel $i^2$ as to permit the latter, and with it the toothed wheel and the pinion, to make a single forward movement and thereby to move the next succeeding index-ring one step forward. It will be evident that either of the two locking devices shown or any other suitable form may be employed without affecting materially the operation of the other parts of the cyclometer. It will be obvious, however, that the form of locking device shown in Figs. 1 and 4 will more readily permit the index-rings to be set back to zero whenever required, and for this reason such form may be considered preferable. I have shown the support or hub $a$ as a block formed integral with the plate and milled out to receive the transmitting-gears and locking devices; but it will be evident that such hub or support might be made in any form suitable for this purpose—such, for example, as an independent shell or frame attached to the plate A.

Various other modifications in details of construction and arrangement might be made without departing from the spirit of my invention, and I do not desire to limit my invention to the precise construction shown except as may be pointed out in the claims.

What I claim, and desire to secure by Letters Patent, is—

1. The combination with a chambered support and an actuating shaft, of index rings mounted to revolve on said support, a series of transmitting gears disposed within the chamber of said support and adapted to transmit movement from each of said index rings to the next in order, the hubs of said gears being flattened, spring arms supported within the chamber and bearing upon the opposite flattened faces of said gear-hubs, and means for actuating the first of said rings from said actuating shaft, substantially as shown and described.

2. The combination with a chambered support and index rings mounted to revolve on said support, of an actuating shaft, a series of transmitting gears disposed within the chamber of said support and adapted to transmit movement from each of said index rings to the next in order, a stationary internal gear, an eccentric fixed on said shaft and two differential gear wheels mounted on said eccentric and meshing respectively with the aforesaid stationary internal gear and with an internal gear secured to the first of said index rings, substantially as shown and described.

3. The combination with a chambered support and index rings mounted to revolve on said support, of an actuating shaft, a series of transmitting gears disposed within the chamber of said support and adapted to transmit movement from each of said index rings to the next in order, a disk fixed against the end of said support, an internal gear formed on said disk, an eccentric fixed on said shaft and two differential gear wheels fixed together and mounted on said eccentric and meshing respectively with the aforesaid internal gear and with an internal gear formed on the first of said index rings, substantially as shown and described.

4. The combination with a support and index rings mounted to revolve on said support, of an actuating shaft, a series of transmitting gears adapted to transmit movement from each of said index rings to the next in order, a shouldered eccentric mounted on said shaft, two gears mounted on said eccentric and connected to move together, being retained in place by the head or shoulder of said eccentric, a fixed internal gear within which one of said first-named gears is adapted to engage as it is rolled by the eccentric, and an internal gear connected to the first of said index rings and adapted to be engaged by the other of said first-named gears, substantially as shown and described.

5. The combination with a support and index rings mounted to revolve on said support, of an actuating shaft, a series of transmitting gears adapted to transmit movement from each of said index rings to the next in order, a stepped or shouldered eccentric mounted on said shaft, two gears mounted on the different parts or steps of said eccentric and connected to move together whereby said gears are retained in place, a fixed internal gear carried by said support and within which one of said first-named gears is adapted to engage as it is rolled by the eccentric, and an internal gear connected to the first of said index rings and adapted to be engaged by the other of said first-named gears, substantially as shown and described.

6. The combination with a support, a series of index rings mounted to revolve on said support, an actuating shaft and a series of transmitting gears to transmit movement from each of said index rings to the next in order, of an actuating wheel secured to said shaft, a spring interposed between said wheel and said support, a shouldered eccentric carried by the other end of the shaft, and differential gears mounted on said eccentric to transmit movement therefrom to the first of said index rings and held by said shouldered eccentric and said spring acting through said shaft against said support, whereby accidental movement of said actuating wheel, shaft and gearing is prevented, substantially as shown and described.

This specification signed and witnessed this 25th day of April, A. D. 1895.

CURTIS H. VEEDER.

In presence of—
W. J. FULLER,
F. L. BISHOP.